Patented June 9, 1936

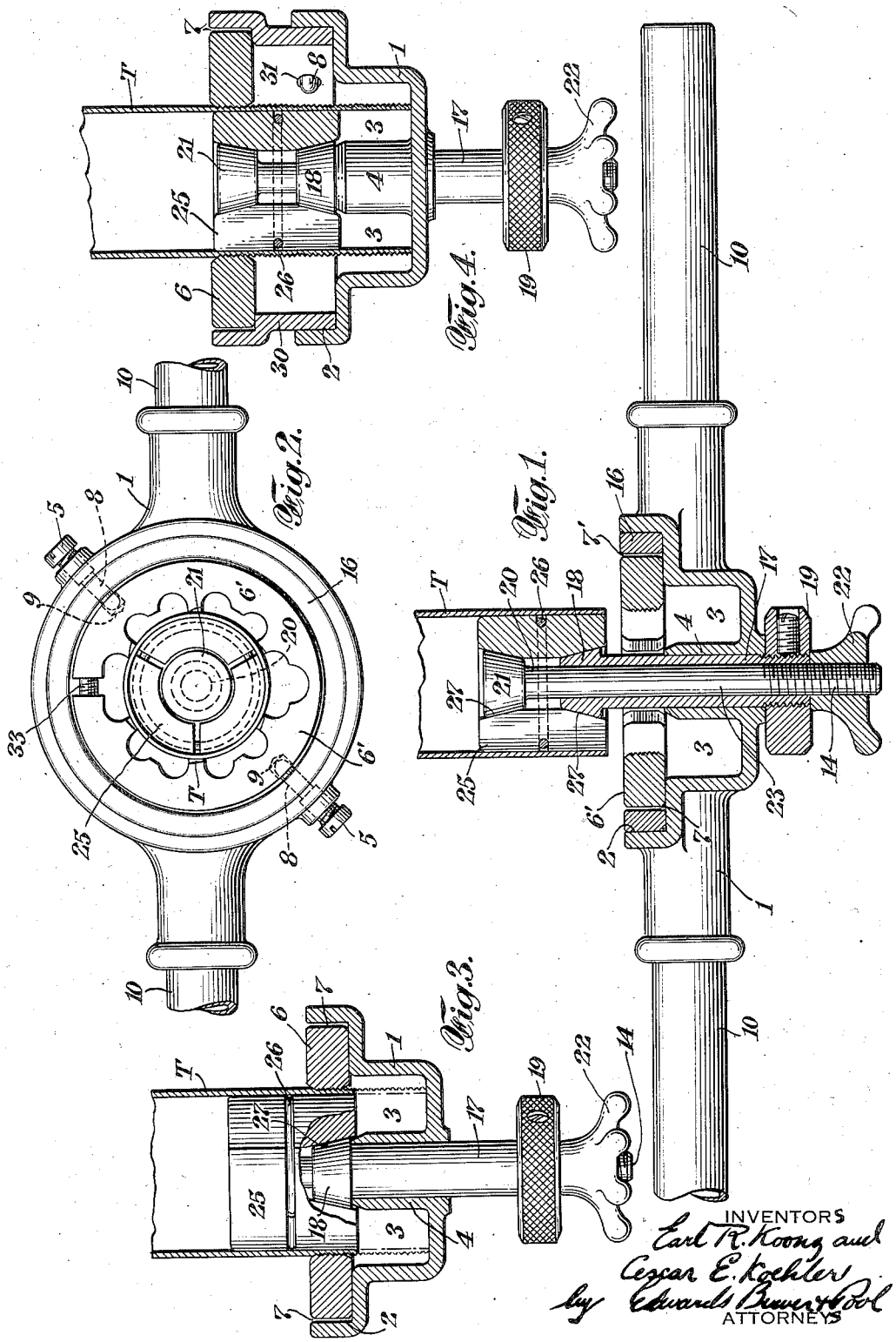

2,043,353

UNITED STATES PATENT OFFICE 2,043,353

TUBE THREADING DEVICE

Earl R. Koonz and Oscar E. Koehler, Greenfield, Mass., assignors to Greenfield Tap and Die Corporation, Greenfield, Mass., a corporation of Massachusetts Application March 13, 1935, Serial No. 10,763

3 Claims. (Cl. 10—123)

This invention relates to devices for the threading of thin walled tubing, and particularly to a die stock and interchangeable dies for this purpose.

Thin tubing is often plated and generally used where it is exposed to view so that it is important to avoid marring the surface finish. Its threading is usually very fine, in the neighborhood of twenty-seven per inch, and when, as is frequently the case, the tube end is irregular and not cut off squarely the threading is very difficult to start properly.

The object of this invention is to provide a die stock and die combination which will center the tubing by internal applied expanding forces and bring the cutting die into proper cooperative relation to automatically aline itself on the tube and start the thread accurately and complete the threading to desired distance from the end.

In the accompanying drawing illustrating the invention

Fig. 1 is a vertical sectional view of a die stock and die with the end of the pipe or tube shown opposed on the clamping means, Fig. 2 is a plan view of the device shown in Fig. 1, Fig. 3 is a vertical sectional view of a die stock and die taken at a plane of 90° from the plane of the section in Fig. 1, and Fig. 4 is a vertical sectional view illustrating the use of an extension bushing.

The die stock center 1 is preferably made of an aluminum casting that contains a die recess 2, a tubing well 3 and guide sleeve hub 4. The hollow handles 10 cast integral with the stock center form the means for rotating the device to form the thread. A range of dies, one of which is shown at 6 (Fig. 3), fits into the recess 2 with a tolerance 7 sufficient to permit the die to slide transversely and center itself on the tubing. Another range of die sizes, one of which is shown at 6' (Figs. 1 and 2) fits with a tolerance indicated at 7' within a filler ring 16. Screws 5 with pilot points 8 extend into peripheral recesses in the dies 6, 6', said points 8 being sufficiently long to extend through openings in the filler ring 16. The fit between the pilot points 8 and the recesses 9 of the dies 6, 6' are sufficiently loose to permit the die to float and automatically correctly position itself on the end of the tube to be threaded.

A guide sleeve or spindle member 17 having a cone shaped end 18 and a knurled knob 19 secured at the other end, is slidably journaled in the bore of the hub 4. A draw bolt 20 with a cone shaped end 21 and stem 23 passes through the guide sleeve 17 and has a binding nut 22 threaded on the other end 14. A split bushing 25 preferably made in three pieces and held together by a circular spring 26 has in each end a conical recess 27 closely fitting the cone shaped ends 18, 21 of sleeve 17 and draw bolt 20 respectively. In this way, the bushing 25 may be expanded or contracted at will by the operation of nut 22, and the opposing cones 18, 21 react equally to expand or contract the bushing in a plane normal to the axis.

These bushings 25 are made in different sizes to suit the sizes of tubing, such as 1, 1⅛, 1¼, 1⅜ and 1½" corresponding to dies of the range illustrated at 6' (Fig. 1) and to suit larger sizes of tubing, such as 1¾ and 2" corresponding to dies of the range illustrated at 6 in Fig. 3. Since the bushings may be expanded or contracted within a fairly wide scope, the bushing of a given size will usually accommodate the various gauges of wall thicknesses in which the tubing is made.

In operation having assembled the correct die 6, 6' in the die recess and having the corresponding bushing 25 on the expanding cones 18, 21, this bushing is inserted into the tubing T approximately the full length of the bushing, in which position the stock and die are about 3/16" from the end of the tubing. Binding nut 22 is tightened, knob 19 being held for this purpose, thereby expanding the bushing 25 within the tubing T and reinforcing the same. The bushing and tubing thus become in effect a solid piece, overcoming any distortion of the tubing and maintaining it accurately cylindrical for the threading operation. In this condition the die is squarely alined with the axis of the tubing and the die stock may now be slidably rotated on guide sleeve 17 until the die has cut the thread, which is generally as long as the die is thick. If a longer thread is desired, the binding nut 22 may be released causing the collapse of bushing 25, and it is then pushed further into the tubing, re-expanded and the threading proceeded with as above described. This may be repeated until the end of the tubing T strikes the bottom of the tube well 3.

Where a still longer thread is desired, the pipe and die may be released and removed for insertion in the die recess of a spacer bushing 30 (Fig. 4) having openings 31 for the ends 8 of the holding screws and itself carrying similar holding screws to retain the die 6 in place. When the die and tube are re-inserted over the bushing 25, this is re-expanded and the threading operation continued until the end of the tube T again strikes against the bottom of the tube well 3 (Fig. 4).

The dies are provided with a locking adjusting screw 33 to preserve the adjustment and maintain the thread alinement.

The internal transversely expanding bushing 25 and the guide stem 17 accurately position the tube, and the die 6, 6' automatically positions itself to start the thread with even depth all around. Tubing of this type is so thin that a die started crooked will often cut through the tube wall. The bushing 25 re-shapes any distortion of the tubing, and since it is fixed in position with relation to the tube does not tend to mar or mark even the inside surfaces. A larger range of different sizes of dies is easily accommodated and the corresponding size of bushing 25 readily positioned on the supporting cones. The various lengths of threading are conveniently provided for by a simple corresponding adjustment of the expanding bushing within the tube to carry the threading to any desired length within the limits of the tube well 3 as increased by the extension bushing 30.

We claim:

1. A die stock comprising a head having a central bore, a spindle member freely rotatable and slidable in said bore, a transversely expanding clamping bushing carried by said spindle member adapted to internally clamp the extreme end of a tube when positioned in said head, a die recess in said head surrounding said spindle member adapted to hold a die substantially concentric therewith to thread the internally clamped end of said tube, and means forming a tube well in said head to receive the said end of the tube after it has passed through said die.

2. A die stock comprising a head having a central bore, a spindle member freely rotatable and slidable in said bore, a transversely expanding clamping bushing carried by said spindle member adapted to internally clamp the extreme end of a tube when positioned in said head, a die recess in said head surrounding said spindle member adapted to hold a die substantially concentric therewith to thread the internally clamped end of said tube, and means for retaining said die loosely in place for alinement against the bottom of said recess and floating transversely to automatically accommodate itself sidewise to the threading of a tube carried by said clamping bushing.

3. A die stock comprising a head having a central bore, a spindle member freely rotatable and slidable in said bore, a transversely expanding clamping bushing carried by said spindle member adapted to internally clamp the extreme end of a tube when positioned in said head, a die recess in said head surrounding said spindle member adapted to hold a die substantially concentric therewith to thread the internally clamped end of said tube, and an extension bushing adapted to be mounted in said die recess and carrying at its outer end another die recess for holding a die to surround and cooperate with said clamping bushing to thread tubing held thereby.

EARL R. KOONZ.
OSCAR E. KOEHLER.